J. A. PETTA.
CENTERING TOOL.
APPLICATION FILED MAR. 27, 1908
908,324.  Patented Dec. 29, 1908.
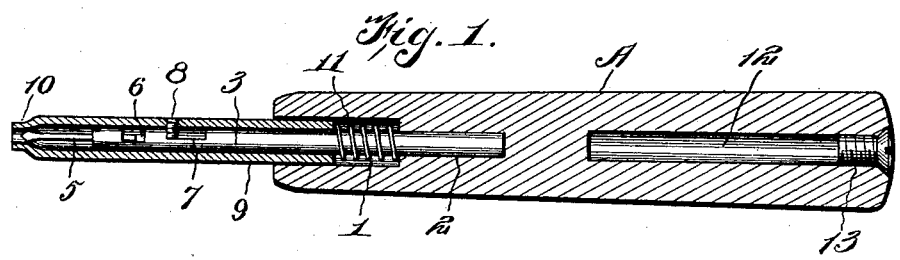
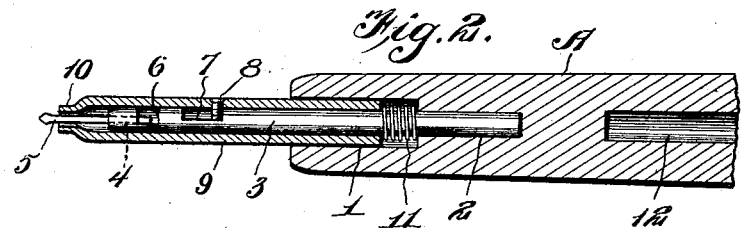
Witnesses
Louis R. Heinrichs
C. Bradway
Inventor
John A. Petta
By Victor J. Evans
Attorney

UNITED STATES PATENT OFFICE.

JOHN A. PETTA, OF SEATTLE, WASHINGTON.

CENTERING-TOOL.

No. 908,324.　　　Specification of Letters Patent.　　　Patented Dec. 29, 1908.

Application filed March 27, 1908. Serial No. 423,736.

*To all whom it may concern:*

Be it known that I, JOHN A. PETTA, a citizen of the United States, residing at Seattle, in the county of King and State of Washington, have invented new and useful Improvements in Centering-Tools, of which the following is a specification.

This invention relates to a jewelry tool and is designed especially for use in obtaining centers while parts are mounted in the chuck of a lathe, as for instance, in finding the center of a staff in order to bore the same to replace a broken pivot.

The invention has for one of its objects to provide a centering tool of this character which is comparatively simple and inexpensive to manufacture and convenient and reliable in use.

A further object of the invention is the provision of a tool consisting of the shank in which the drill is mounted and on which is a slidable sleeve that is held projected beyond the point of the drill by a spring, the outer end of the sleeve serving to receive the end of the staff or other part of a watch or the like to be centered.

With these objects in view and others as will appear as the description proceeds, the invention comprises the various novel features of construction and arrangement of parts which will be more fully described hereinafter and set forth with particularity in the claims appended hereto.

In the accompanying drawing which illustrates one of the embodiments of the invention:—Figure 1 is a central longitudinal sectional view of the tool showing the sleeve in normal position. Fig. 2 is a similar view showing the sleeve pressed inwardly as in the process of drilling.

Similar reference characters are employed to designate corresponding parts throughout the several views.

Referring to the drawing, A designates the handle of any approved material and design and having at its inner end two alining sockets 1 and 2 of different diameters, the socket of smaller diameter being innermost. Fitted in the socket 2 is a fixed rod 3 forming the shank of the tool, the rod being of such length as to project a suitable distance out or the socket 1. The outer end of the shank or rod 3 has a central bore 4 for receiving the drill 5 and adjacent the extremity of the shank is a transverse slot 6 into which the rear end of the tool extends, the slot permitting of the insertion of a suitable instrument for forcing the drill loose when it is desired to remove the same. Disposed inwardly from the slot 6 is a recess 7 for receiving the inner end of a screw 8 that constitutes the stop for limiting the movement of the sleeve 9 that houses the drill. The outer end of the sleeve is contracted as shown at 10 and between the opposite or inner end of the sleeve and inner wall of the socket 2 is a helical spring 11 that encircles the shank 3, the spring being under such tension as to normally hold the sleeve projected so that the outer end of the latter will extend beyond the point of the drill, thus protecting the latter from injury when the tool is not in use. The handle A is provided with a chamber 12 normally closed by a cap such as a screw 13 so that drills of different sizes may be stored.

In practice the work to be centered is mounted in a chuck of a lathe and as the work rotates the tool is applied thereto by placing the outer end of the sleeve in engagement with the work and while thus held in central position the pressure is applied to the handle in a direction toward the work. The sleeve 9 is thus pressed inwardly so as to bring the drill into engagement with the work, the spring 11 yielding to the pressure applied by the operator on the handle. In this manner, the work can be drilled and an absolute center obtained.

From the foregoing description taken in connection with the accompanying drawing, the advantages of the construction and of the method of operation will be readily apparent to those skilled in the art to which the invention appertains and while I have described the principles of operation of the invention, together with the device which I now consider to be the best embodiment thereof, I desire to have it understood that the device shown is merely illustrative and that such changes may be made when desired as are in the scope of the claims.

Having thus described the invention, what I claim as new is:—

1. In a tool of the class described, the combination of a handle having alining sockets of different diameters at one end, a rod secured in the smaller socket and projecting out of the handle and having a longitudinally extending drill receiving bore at its extremity, a sleeve slidably mounted on and movable longitudinally of the rod and entering the larger socket, a compression spring housed within the larger socket and bearing at one end on the inner wall of the latter and at its opposite end on the inner extremity of the sleeve and encircling the said rod, said rod having a slot, and a stop removably carried by the slot, and engaging in the slot for limiting the movement of the sleeve and forming the sole means for retaining the latter on the rod, said sleeve having its outer end normally projecting beyond the drill in the rod.

2. The combination of a handle having a socket in its end, a rod secured in the socket and having its end provided with a central bore and recesses, a drill arranged in the said bore with its inner end extending into one of the recesses, a sleeve slidably mounted on the rod, a counter-sunk screw on the sleeve and extending into the other recess of the rod, and a spring arranged to normally hold the sleeve with its outer end projecting beyond the point of the drill and permitting the sleeve to yield inwardly into the socket.

In testimony whereof I affix my signature in presence of two witnesess.

JOHN A. PETTA.

Witnesses:
 SAML. H. JOHNSTON,
 JOEL P. GEER.